(12) United States Patent
Park et al.

(10) Patent No.: US 7,961,670 B2
(45) Date of Patent: Jun. 14, 2011

(54) APPARATUS AND METHOD FOR SELECTING RELAY STATION IN BROADBAND WIRELESS COMMUNICATION SYSTEM

(75) Inventors: Won-Hyoung Park, Seoul (KR); Myeon-Kyun Cho, Seongnam-si (KR); Dai-Kwan Kim, Seoul (KR); Dae-Sik Hong, Seoul (KR); Sang-Min Ro, Seoul (KR); Young-Ju Kim, Seoul (KR)

(73) Assignees: Samsung Electronics Co., Ltd. (KR); Industry-Academic Cooperation Foundation, Yonsei University (KR)

( * ) Notice: Subject to any disclaimer, the term of this patent is extended or adjusted under 35 U.S.C. 154(b) by 784 days.

(21) Appl. No.: 11/848,099

(22) Filed: Aug. 30, 2007

(65) Prior Publication Data

US 2008/0056199 A1 Mar. 6, 2008

(30) Foreign Application Priority Data

Aug. 30, 2006 (KR) .......................... 10-2006-0082778

(51) Int. Cl.
*H04Q 7/00* (2006.01)
*H04L 12/28* (2006.01)
(52) U.S. Cl. ........................................ 370/328; 370/401

(58) Field of Classification Search .................. 370/328, 370/332, 333, 338, 401
See application file for complete search history.

(56) References Cited

U.S. PATENT DOCUMENTS

| 6,956,906 | B2 * | 10/2005 | Tager et al. .................. 375/260 |
| 7,720,020 | B2 * | 5/2010 | Larsson ........................ 370/315 |
| 2009/0061767 | A1 * | 3/2009 | Horiuchi et al. ................ 455/18 |

FOREIGN PATENT DOCUMENTS

| JP | 7193858 | 7/1995 |
| KR | 100166635 | 9/1998 |
| KR | 1020050013023 | 2/2005 |
| KR | 1020060014113 | 2/2006 |

* cited by examiner

*Primary Examiner* — Hong Cho
(74) *Attorney, Agent, or Firm* — The Farrell Law Firm, P.C.

(57) ABSTRACT

Selection of a relay station in a broadband wireless communication system is provided. In the broadband wireless communication system, a Base Station (BS) includes a sorter for generating a first index group in which indices of relay stations are sorted according to channel information between the BS and each relay station; a receiver for receiving a second index group in which the indices of the relay stations are sorted according to channel information between a Mobile Station (MS) and each relay station; and a selector for selecting a relay station to be used to communicate with the MS by using the first index group and the second index group.

17 Claims, 5 Drawing Sheets

APPARATUS AND METHOD FOR SELECTING RELAY STATION IN BROADBAND WIRELESS COMMUNICATION SYSTEM

PRIORITY

This application claims priority under 35 U.S.C. §119 to an application filed in the Korean Intellectual Property Office on Aug. 30, 2006 and assigned Serial No. 2006-82778, the contents of which are incorporated herein by reference.

BACKGROUND OF THE INVENTION

1. Field of the Invention

The present invention relates to a broadband wireless communication system, and in particular, to an apparatus and method for selecting a relay station in a broadband wireless communication system.

2. Description of the Related Art

In the next generation communication system, also known as the 4-th Generation (4G) communication system, research is actively in progress to provide a Quality of Service (QoS) with a data transfer speed of about 100 Mbps. In particular, research on a communication system supporting high speed service while providing mobility and ensuring QoS is actively being conducted. An example of such a communication system is the Institute of Electrical and Electronics Engineers (IEEE) 802.16 communication system.

The IEEE 802.16 communication system employs an Orthogonal Frequency Division Multiplexing (OFDM)/Orthogonal Frequency Division Multiple Access (OFDMA) scheme allowing a physical channel of a wireless communication system to support a broadband network. In the IEEE 802.16 communication system, there is a growing demand for the mobility of a Mobile Station (MS) and the flexibility of implementing a wireless network. Further, it is also demanded that services be effectively provided in a network environment where a traffic distribution or a call request rate rapidly changes. The communication system under consideration, which is capable of dealing with these demands is one in which a multi hop relay type data transfer method is employed by the use of a relay station and an MS located near the relay station.

Throughput can be improved when the relay station is used in the broadband wireless communication system. That is, where a direct link channel between a Base Station (BS) and an MS has poor quality, the relay station may be used to provide relatively better channel quality. Furthermore, by utilizing the relay station, spatial diversity effect can be achieved since multiple-replicas of the transmitted signal are received via multiple links formed by BS, relays, and MS. In case of downlink transmission, multiple links are composed of BS-relay-MS links and a BS-MS link. Multiple links can be also formed by MS-relay-BS links and a MS-BS link in case of uplink transmission.

A method for selecting the most suitable relay station is needed for the effective use of relay stations. Conventional methods to select relay stations can be classified into two cases, selection of relays with or without channel information.

The method without channel information includes a Random Selection (RS) method and a Fixed Priority Selection (FPS) method. In the RS method, a BS randomly selects one relay station from a plurality of candidate relay stations. In the FPS method, priority of each relay station is predetermined for an MS. Since channel information is not used in the RS method and the FPS method, the BS can select relay stations with a simple procedure. However, there is no guarantee that the selected relay station is the most suitable relay station to achieve the best performance.

Meanwhile, methods with channel information include a Maximum received SNR Selection (MSS) method and a Maximum Total SNR Selection (MTS) method. In the MSS method, channel information (e.g., Signal to Noise Ratio (SNR)) between the BS and the relay station is used for the relay selection. In the MTS method, channel information between the BS and the relay station and channel information between the relay station and the MS are both used. That is, in the MSS method, the BS directly measures the channel information between the BS and the relay station, and then the relay station is selected using the channel information. In the MTS method, in addition to the channel information between the BS and the relay station, the relay station is selected by receiving the feedback of the channel information between the MS and the relay station which cannot be directly estimated at BS. By using them, BS derives total SNRs for all possible relay channels and selects relay stations which form relay channels with best total SNRs. Therefore, when using the MTS method, the selection of the most suitable relay station is ensured since all possible relay channels have been taken into account.

Accordingly, when a relay station is selected in a broadband wireless communication system, the MTS method can be a solution to select the most suitable relay station. However, when using the MTS method, overhead increases due to the feedback of channel information for relay-MS links. In addition, the process of selecting a relay station is further complicated since the total SNR of relay channel should be calculated for all possible relay channels.

SUMMARY OF THE INVENTION

The present invention provides an apparatus and method for reducing the data size of feedback information when a relay station is selected in a broadband wireless communication system.

The present invention also provides an apparatus and method for simplifying the process of selecting a relay station in a broadband wireless communication system.

According to a first aspect of the present invention, there is provided an apparatus for a Mobile Station (MS) in a relay type broadband wireless communication system. The apparatus includes an estimator for estimating channel information of a plurality of relay stations; a sorter for sorting indices of the relay stations by using the channel information; and a transmitter for transmitting to a Base Station (BS) information on a predetermined number of indices selected from the sorted indices.

According to a second aspect of the present invention, there is provided an apparatus for a BS in a relay type broadband wireless communication system. The apparatus includes a sorter for generating a first index group in which indices of relay stations are sorted according to channel information between the BS and each relay station; a receiver for receiving a second index group in which the indices of the relay stations are sorted according to channel information between an MS and each relay station; and a selector for selecting a relay station to be used to communicate with the MS by using the first index group and the second index group.

According to a third aspect of the present invention, there is provided a method of operating an MS in a broadband wireless communication system. The method includes estimating channel information of a plurality of relay stations; sorting indices of the relay stations by using the channel information; and transmitting to a BS information on a predetermined number of indices selected from the sorted indices.

According to a fourth aspect of the present invention, there is provided a method of operating a BS in a relay type broadband wireless communication system, including generating a first index group in which indices of relay stations are sorted according to channel information between the BS and each relay station; receiving from an MS a second index group in which the indices of the relay stations are sorted according to channel information between the MS and each relay station; and selecting a relay station to be used to communicate with the MS by using the first index group and the second index group.

According to a fifth aspect of the present invention, there is provided a method of operating an MS in a relay type broadband wireless communication system, including generating a first index group in which indices of relay stations are sorted in descending order relative to the Signal to Noise Ratio (SNR) between the MS and each relay station; receiving from a BS a second index group in which the indices of the relay stations are sorted in descending order relative to the SNR between the BS and each relay station; and selecting a relay station to be used to communicate with the BS by using the first index group and the second index group.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

A preferred embodiment of the present invention will be described herein below with reference to the accompanying drawings. In the following description, well-known functions or constructions are not described in detail since they would obscure the invention in unnecessary detail.

A technique will be described hereinafter in which a relay station is selected to relay a signal between a transmitting end and a receiving end in a broadband wireless communication system. Although the broadband wireless communication system to be described below is based on Orthogonal Frequency Division Multiplexing (OFDM) and Time Division Duplex, this is for exemplary purpose only. Thus, the present invention may also be applied to a cellular-based communication system using a relay station.

Figure 1:
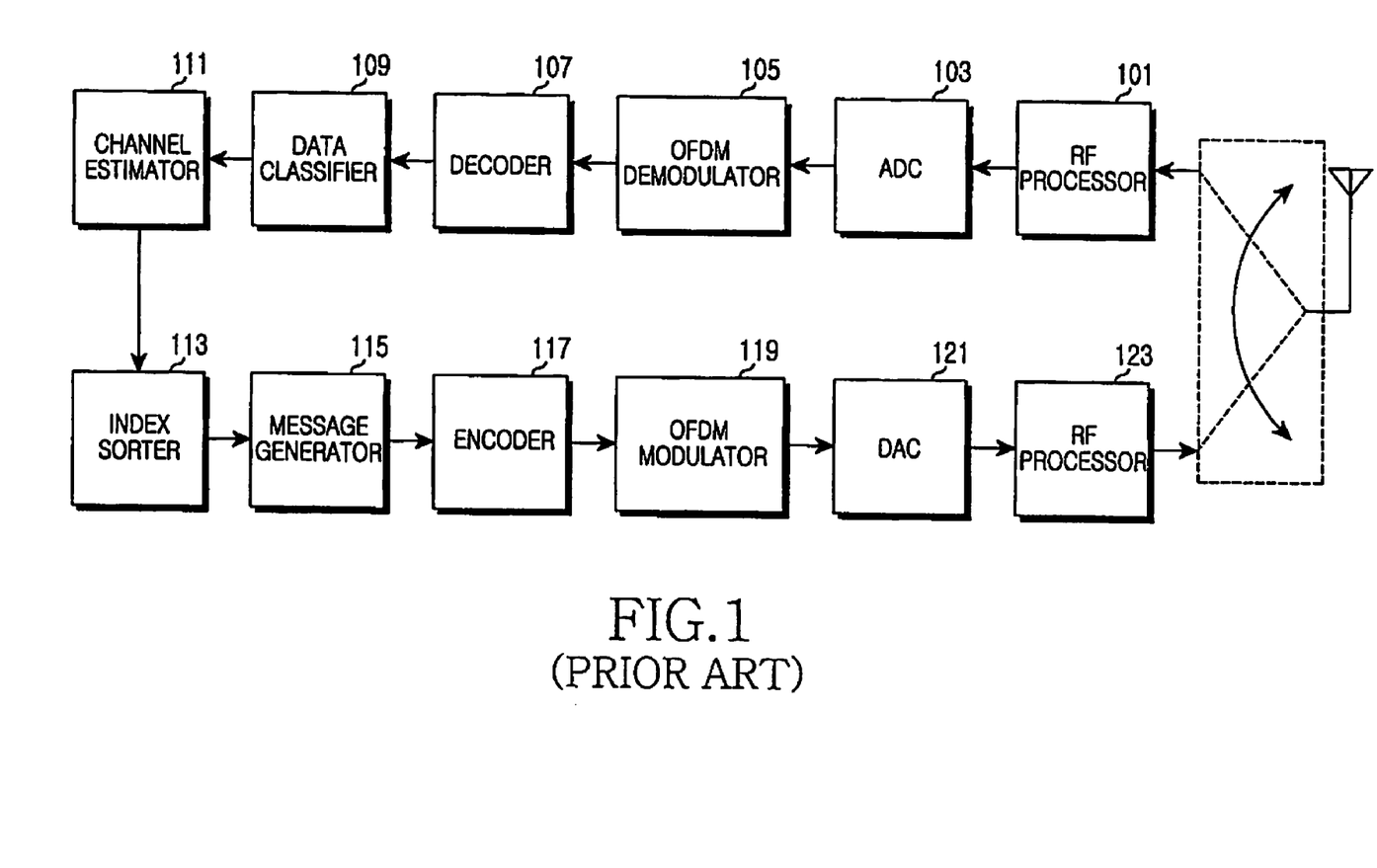
FIG. 1 is a block diagram of a Mobile Station (MS) in a broadband wireless communication system according to the present invention.

Referring to FIG. 1, the MS includes a Radio Frequency (RF) processor 101, an Analog Digital Converter (ADC) 103, an OFDM demodulator 105, a decoder 107, a data classifier 109, a channel estimator 111, an index sorter 113, a message generator 115, an encoder 117, an OFDM modulator 119, a Digital Analog Converter (DAC) 121, and an RF processor 123.

RF processor 101 converts an RF signal received through an antenna to a baseband analog signal. ADC 103 converts the analog signal provided by RF processor 101 to a digital signal. OFDM demodulator 105 performs a Fast Fourier Transform (FFT) operation on the time-domain data provided by ADC 103 and thus outputs frequency-domain data. Decoder 107 decodes the data provided by OFDM demodulator 105 at a predetermined encoding rate, thereby decoding the data from a bit-stream.

Data classifier 109 reads the data provided by decoder 107, checks the message type of the received data, and provides corresponding information to a device requiring that information. For example, upon checking a pilot signal, data classifier 109 provides the pilot signal to channel estimator 111.

Channel estimator 111 estimates a channel by using the pilot signal provided by data classifier 109. In particular, when a relay station is selected according to the present invention, channel estimator 111 uses the pilot signal received from a plurality of candidate relay stations and measures a Signal to Noise Ratio (SNR) of each relay station.

Index sorter 113 sorts indices of the candidate relay stations in order with respect to the SNR provided by channel estimator 111 so that channel information of the candidate relay stations is fed back to a Base Station (BS). For example, if M candidate relay stations exist, index sorter 113 creates a vector as expressed by Vector Equation (1) in which the indices of the candidate relay stations are sorted in the order relative to SNR.

$$S_s = \{J_1, J_2, J_3, \ldots, J_M\} \quad (1)$$

In Equation (1), $S_s$ denotes an index vector in which indices of candidate relay stations are sorted, and $J_k$ ($1 \leq k \leq M$, k is integer) denotes an index of a candidate relay station.

Message generator 115 generates a message including a control signal and data to be transmitted to the BS. In particular, when a relay station is selected according to the present invention, message generator 115 generates a message including the index vector of Vector Equation (1). Specifically, in order to reduce overhead caused by the feedback of channel information of the candidate relay stations, using only a sorted index vector while excluding the measured SNR generates the message. Message generator 115 may generate a message including only first N elements of the sorted index vector. Since a possibility of selecting a relay station having a very low SNR is relatively low, the same performance can be expected even if an index of that relay station is not included in the vector.

Encoder 117 encodes the data provided by message generator 115 at a predetermined encoding rate. OFDM modulator 119 performs Inverse Fast Fourier Transform (IFFT) on the data provided by encoder 117 and thus outputs time-domain data. DAC 121 converts the data received from OFDM modulator 119 to an analog signal. RF processor 123 converts the analog signal received from DAC 121 to an RF signal and then transmits the RF signal through the antenna.

Figure 2:
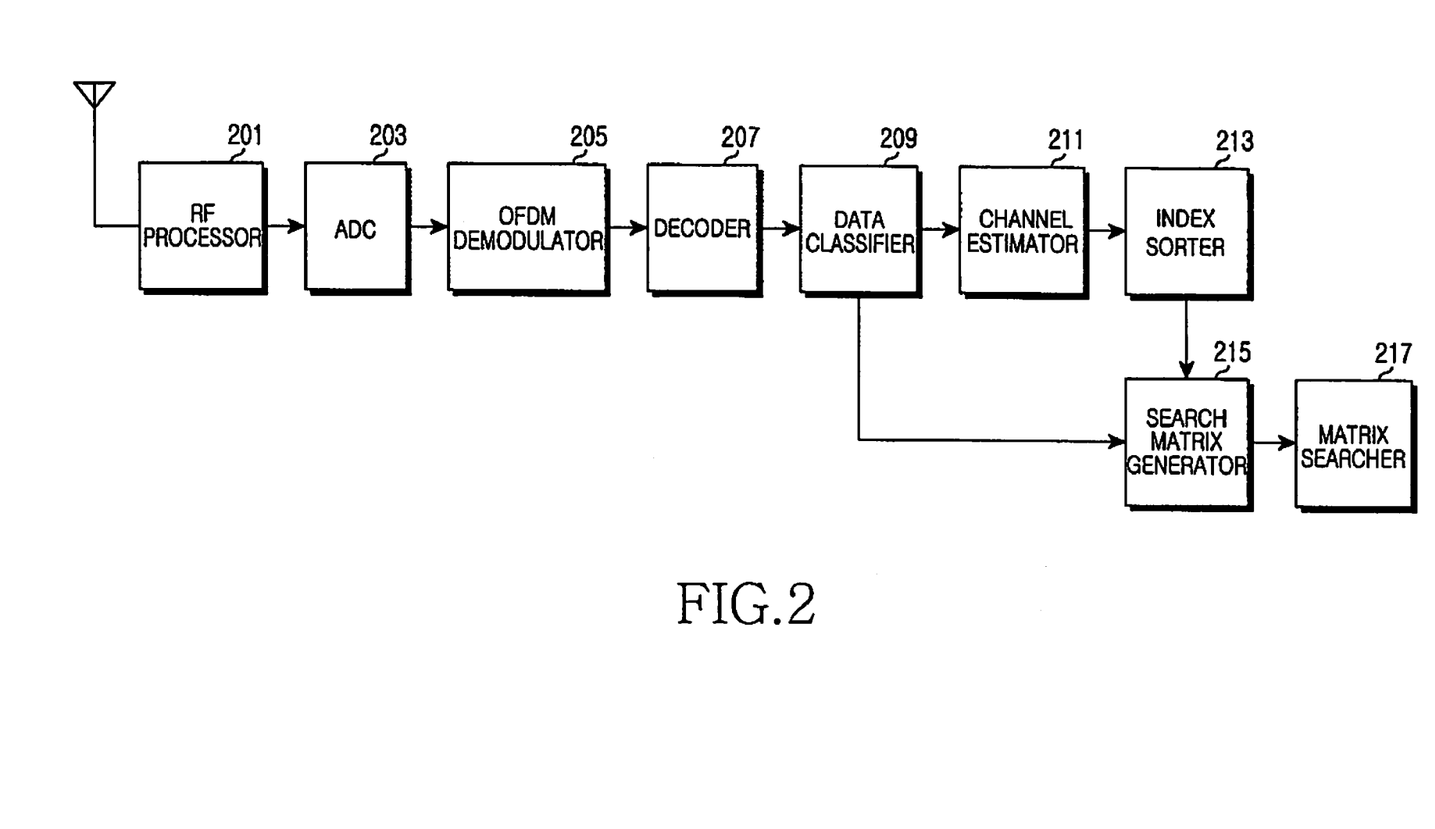
FIG. 2 is a block diagram of a Base Station (BS) in a broadband wireless communication system according to the present invention.

Referring to FIG. 2, the BS includes an RF processor 201, an ADC 203, an OFDM demodulator 205, a decoder 207, a data classifier 209, a channel estimator 211, an index sorter 213, a search matrix generator 215, and a matrix searcher 217.

RF processor 201 converts an RF signal received through an antenna to a baseband analog signal. ADC 203 converts the analog signal provided by RF processor 201 to a digital signal. OFDM demodulator 205 performs an FFT operation on the time-domain data provided by ADC 203 and thus outputs frequency-domain data. Decoder 207 decodes the data provided by OFDM demodulator 205 at a predetermined encoding rate, thereby decoding the data from a bit-stream.

Data classifier 209 checks a message contained in the data provided by decoder 207. Specifically, data classifier 209 reads the data, checks a message type of the data, and provides corresponding information to a device requiring that information. For example, upon checking a pilot signal, data classifier 209 provides the pilot signal to channel estimator 211. In addition, upon checking an index vector received from an MS, data classifier 209 provides the received index vector to search matrix generator 215.

Channel estimator 211 estimates a channel by using the pilot signal provided by data classifier 209. In particular, when a relay station is selected according to the present invention, channel estimator 211 uses the pilot signal received from a plurality of candidate relay stations and measures a SNR of each relay station.

Index sorter 213 sorts indices of the candidate relay stations in the order of the SNR provided by channel estimator 211 so that a search matrix is generated for the selection of a relay station. For example, if M candidate relay stations exist, index sorter 213 creates a vector as expressed by Vector Equation (2) in which the indices of candidate relay stations are sorted relative to the SNR.

$$S_D = \{I_1, I_2, I_3, \ldots, I_M\} \quad (2)$$

In Vector Equation (2), $S_D$ denotes an index vector in which indices of candidate relay stations are sorted, and $I_k$ ($1 \leq k \leq M$, k is integer) denotes an index of a candidate relay station.

Search matrix generator 215 receives from index sorter 213 an index vector in which indices of the candidate relay stations are sorted in order with respect to the SNR between a BS and a relay station, receives from data classifier 209 an index vector in which the indices of the candidate relay stations are sorted in the order of SNR between an MS and a relay station, and generates a search matrix for the selection of the most suitable relay station. For example, when M candidate relay stations exist, the search matrix may be expressed by Matrix Equation (3).

$$S = \begin{bmatrix} s_{1,1} & s_{1,2} & s_{1,3} & \cdots & s_{1,M-1} & s_{1,M} \\ s_{2,1} & s_{2,2} & s_{2,3} & \cdots & s_{2,M-1} & s_{2,M} \\ s_{3,1} & s_{3,2} & s_{3,3} & \cdots & s_{3,M-1} & s_{3,M} \\ \cdots & \cdots & \cdots & \cdots & \cdots & \cdots \end{bmatrix} \quad (3)$$

In Matrix Equation (3), S denotes a search matrix, and $S_{i,j}$ ($1 \leq i \leq M$, $1 \leq j \leq M$, i,j are integers) denotes an element of the matrix S. Elements of $S_{i,j}$ are either '0' or '1', and when $J_j$ of Equation (1) is equal to $I_i$ of Equation (2), $S_{i,j}$ is set to '1', and otherwise, $S_{i,j}$ is set to '0'.

Matrix searcher 217 selects a relay station by using the search matrix provided by search matrix generator 215. For example, when matrix searcher 217 selects the relay station, an element having a value '1' is searched for from the search matrix of Equation (3) according to the order indicated by numbered arrows. Specifically, the search is carried out starting from an (i,j)-th element whose sum of i and j are the smallest, that is, in the order of $s_{1,1}$, $s_{2,1}$, $s_{1,2}$, $s_{3,1}$, $s_{2,2}$, $s_{1,3}$, ..., and $s_{M,M}$. When the element having a value '1' is found, the relay station corresponding to the found element is selected. For example, if an element $s_{1,1}$ has a value '1', this means that the first element of the vector of Equation (1) and the first element of the vector of Equation (2) have an index of the same relay station. In addition, the relay station has the highest SNR when viewed from both the BS and the MS. Therefore, when an element having a value '1' is searched for in the aforementioned order, a relay station having the best quality relay channel is first selected. A plurality of relay stations may be selected to obtain a better spatial diversity effect.

Figure 3:
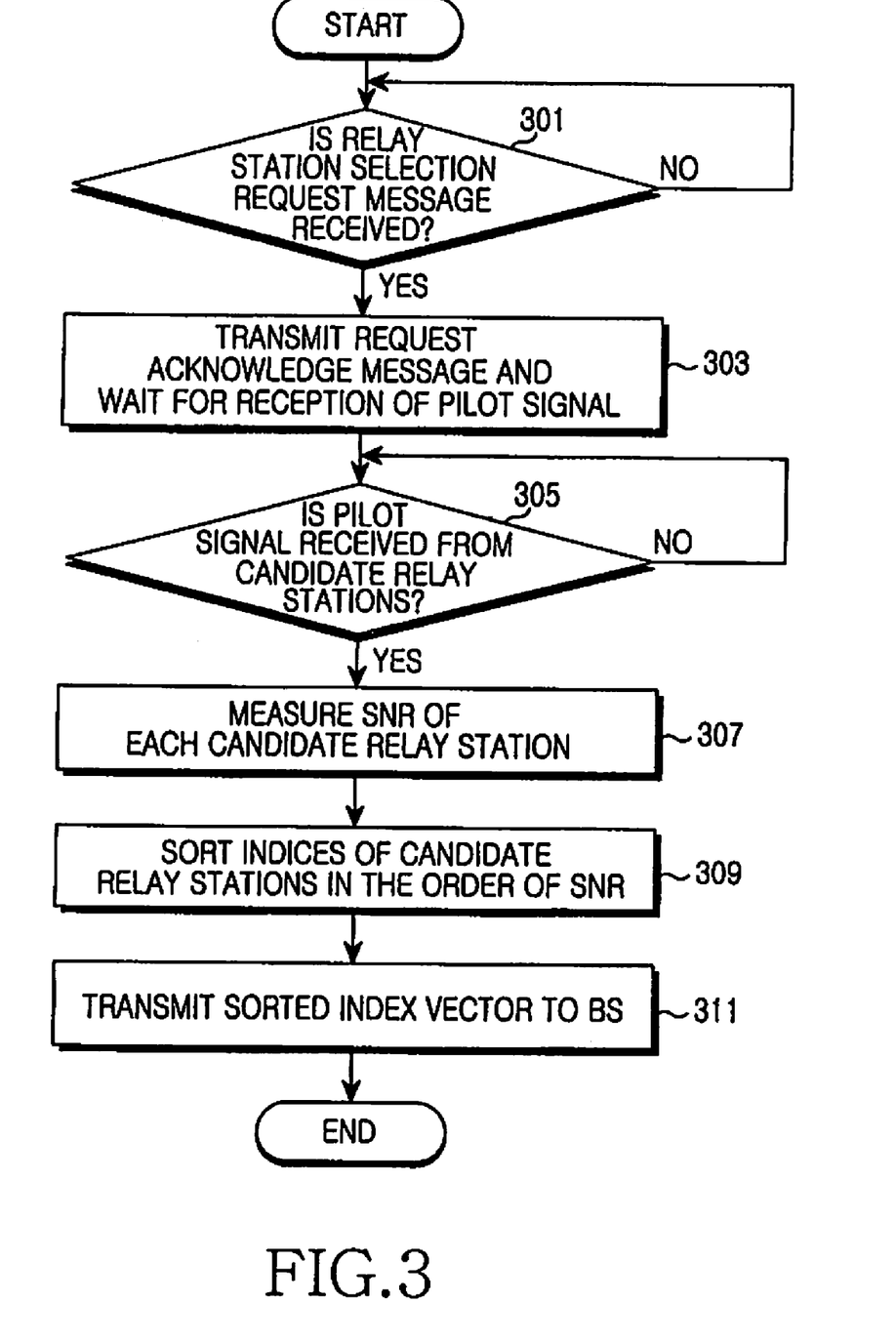
FIG. 3 is a flowchart of a relay station selection process performed by an MS in a broadband wireless communication system according to the present invention.

Referring to FIG. 3, in step 301, it is checked whether a relay station selection request message is received from a BS.

Upon receiving the relay station selection request message, in step 303, a request acknowledge message is transmitted to the BS, and the MS waits for the reception of a pilot signal.

In step 305, the MS checks whether the pilot signal has been received from candidate relay stations. In this case, an index vector of the candidate relay stations is also received together with the pilot signal.

Upon receiving the pilot signal, in step 307, the MS measures the SNR of each candidate relay station by using the received pilot signal.

Thereafter, in step 309, indices of the candidate relay stations are sorted with respect to the measured SNR. For example, the index vector may be created using Equation (1).

In step 311, the sorted index vector is transmitted to the BS; only the first N relay station indices may be transmitted. Since the possibility of selecting a relay station having a very low SNR is relatively low, the same performance can be expected even if an index of that relay station is not included in the vector.

Figure 4:
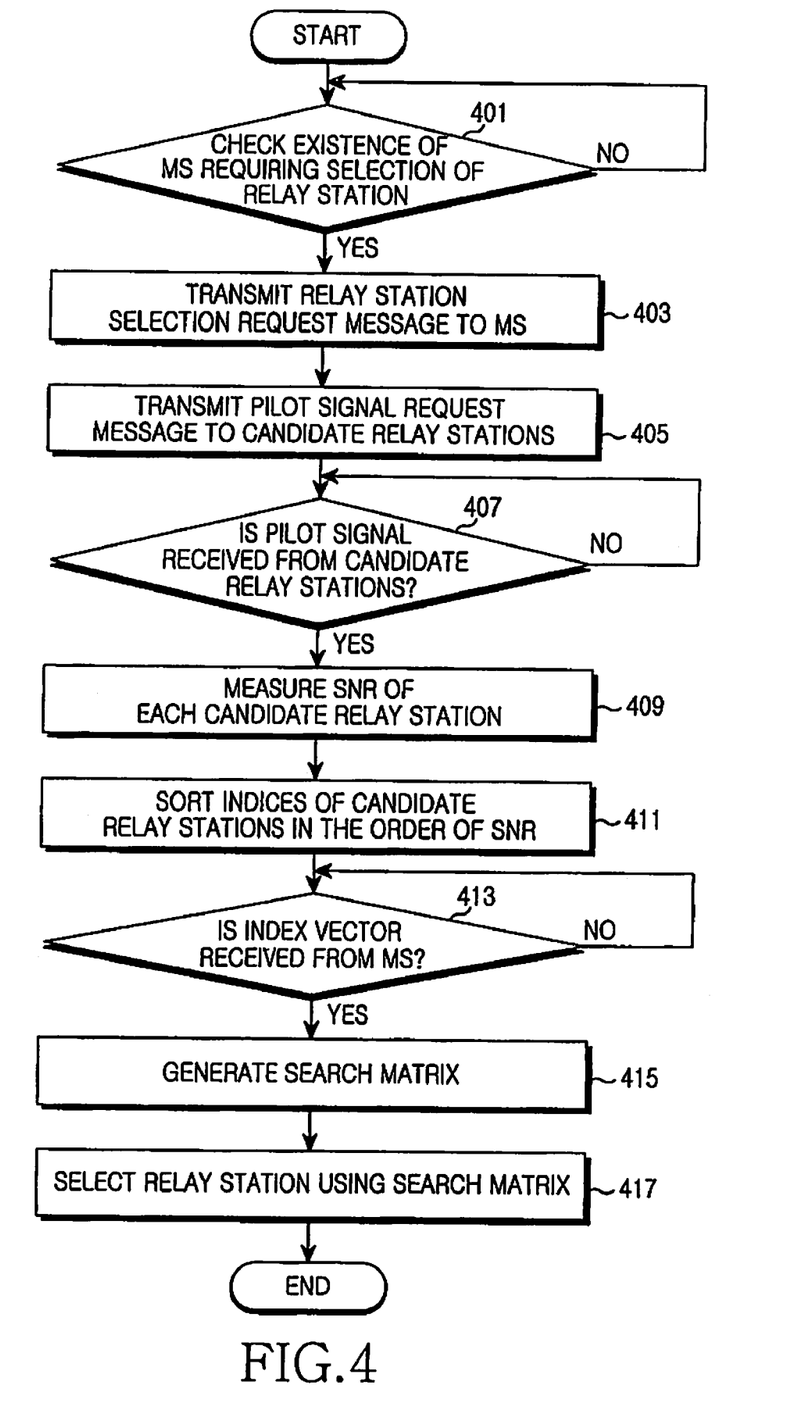
FIG. 4 is a flowchart of a relay station selection process performed by a BS in a broadband wireless communication system according to the present invention.

Referring to FIG. 4, in step 401, the BS checks whether there is an MS requiring the selection of a relay station. That is, the BS checks the existence of the MS requiring a new channel due to poor quality of communication channel.

Upon detecting the MS, in step 403, the BS transmits to the MS a relay station selection request message.

Thereafter, in step 405, the BS broadcasts a pilot signal request message to candidate relay stations.

In step 407, the BS checks whether the pilot signal has been received from the candidate relay stations. In this case, an index vector of the candidate relay stations is also received together with the pilot signal.

Upon receiving the pilot signal, in step 409, the MS measures the SNR of each candidate relay station by using the received pilot signal.

Thereafter, in step 411, indices of the candidate relay stations are sorted in order relative to the measured SNR. For example, the index vector may be created using Equation (2).

In step 413, the BS checks whether a relay station index vector in which indices of the candidate relay stations are sorted in the order of SNR has been received from the MS.

Upon receiving the relay station index vector from the MS, in step 415, the BS generates a search matrix for the selection of the most suitable relay station. For example, the vectors of Equations (1) and (2) may be used to generate the search matrix of Equation (3).

After generating the search matrix, in step 417, the BS selects the most suitable relay station by using the search matrix. That is, search is carried out in the order indicated in FIG. 6, and when an element having a value '1' is found, a relay station corresponding to the found element is selected. A plurality of relay stations may be selected to obtain a better spatial diversity effect.

Figure 5:
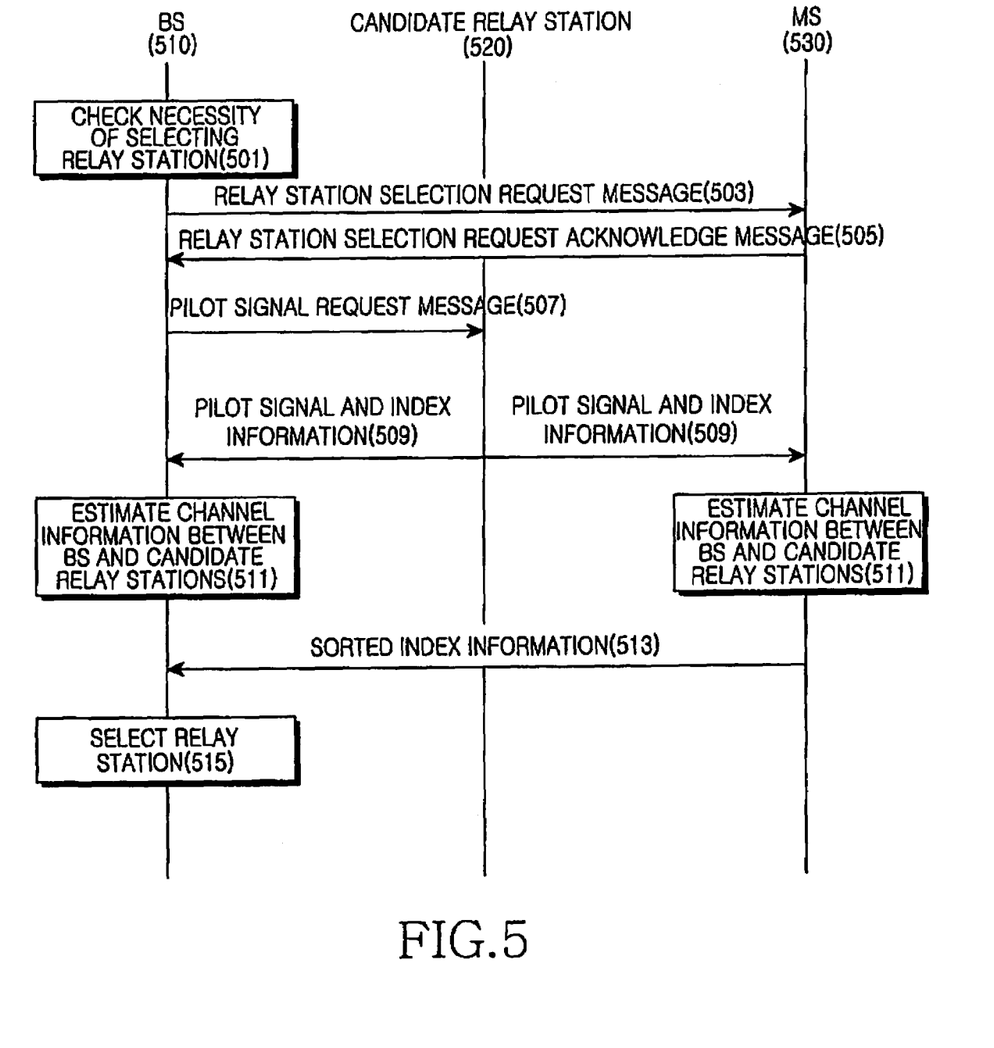
FIG. 5 is a signal flow among a BS, a relay station, and an MS when the most suitable relay station is selected in a broadband wireless communication system according to the present invention.

Referring to FIG. 5, only one candidate relay station is depicted. However, the same signal flows are also applied even if a plurality of candidate relay stations is present. In step 501, a BS 510 checks the necessity of selecting a relay station to communicate with an MS 530.

Then, in step 503, BS 510 transmits a relay station selection request message to the MS 503.

Upon receiving the relay station selection request message, MS 530 transmits a relay station selection request acknowledge message to the relay station 510 in step 505.

Upon receiving the acknowledge message, BS 510 transmits a pilot signal request message to a candidate relay station 520 in step 507. Since one or more candidate relay stations 520 may be present, BS 510 broadcasts the pilot signal request message so that all candidate relay stations can receive the request.

Upon receiving the pilot signal request message, candidate relay station 520 broadcasts a pilot signal and a relay station index vector to BS 510 and MS 530 in step 509.

Upon receiving the pilot signal, BS 510 and MS 530 measure the SNR using the pilot signal for each candidate relay station in step 511.

Thereafter, MS 530 sorts indices of the candidate relay stations in the order of the measured SNR, and transmits an index vector of the sorted indices to BS 510 in step 513.

Upon receiving the index vector from MS 530 in step 515, BS 510 generates a search matrix of Equation (3) by using the received index vector and the measured SNR, and selects a relay station according to the order indicated in FIG. 6.

As described above, a BS selects a relay station by receiving sorted index information from an MS. In addition, the MS may select the relay station by receiving the sorted index information from the BS. In this case, the process shown in FIG. 4 may be used with a small modification.

According to the present invention, a transmitting end of a broadband wireless communication system selects a relay station in consideration of channel information composed of only relay station indices, and thus when the channel information is fed back from the receiving end, the data size of feedback information decreases, thereby reducing overhead. In addition, since a search matrix is generated using an index vector, the search process can be simplified in the selection of the relay station. And the data size of feedback information can be further reduced nearly without performance deterioration by adjusting the size of the index vector While the invention has been shown and described with reference to a certain preferred embodiment thereof, it is a mere exemplary application. Thus, it will be understood by those skilled in the art that various changes in form and details may be made therein without departing from the spirit and scope of the invention as further defined by the appended claims.

What is claimed is:

1. An apparatus for a Base Station (BS) in a relay type broadband wireless communication system, comprising:
   a sorter for generating a first index group in which indices of relay stations are sorted according to channel information between the BS and each relay station;
   a receiver for receiving a second index group in which the indices of the relay stations are sorted according to channel information between a Mobile Station (MS) and each relay station; and
   a selector for selecting a relay station to be used to communicate with the MS by using the first index group and the second index group,
   wherein the selector comprises:
   a generator for generating a search matrix by using the first index group and the second index group; and
   a searcher for searching for a relay station to be used according to the search matrix,
   wherein each element of the search matrix is determined based on a combination of an order of indices in the first index group and an order of indices in the second index group.

2. The apparatus of claim 1, further comprising an estimator for estimating channel information between the MS and each relay station.

3. The apparatus of claim 2, wherein the channel information is a Signal to Noise Ratio (SNR).

4. The apparatus of claim 2, wherein the sorter sorts the indices of the relay stations in descending order relative to the SNR received from the relay stations.

5. The apparatus of claim 1, wherein an (i,j)-th element of the search matrix shows whether an i-th relay station index of the first index group is equal to a j-th relay station index of the second index group.

6. The apparatus of claim 5, wherein the search matrix is expressed as:

$$S = \begin{bmatrix} S_{1,1} & S_{1,2} & \cdots & S_{1,M-1} & S_{1,M} \\ S_{2,1} & S_{2,2} & \cdots & S_{2,M-1} & S_{2,M} \\ \cdots & \cdots & \cdots & \cdots & \cdots \\ S_{M-1,1} & S_{M-1,2} & \cdots & S_{M-1,M-1} & S_{M-1,M} \\ S_{M,1} & S_{M,2} & \cdots & S_{M,M-1} & S_{M,M} \end{bmatrix},$$

where M denotes the number of candidate relay stations, and if the i-th element of the first index vector is equal to the j-th element of the second index vector, $S_{i,j}$ ($1 \leq i \leq M$, $1 \leq j \leq M$, i,j are integers) is set to '1', and otherwise, set to '0'.

7. The apparatus of claim 5, wherein the searcher selects a relay station by sequentially searching the search matrix starting from an (i,j)-th element whose sum is the smallest.

8. The apparatus of claim 7, wherein the searcher selects a plurality of relay stations.

9. A method of operating a Base Station (BS) in a relay type wireless communication system, comprising the steps of:
   generating a first index group in which indices of relay stations are sorted according to channel information between the BS and each relay station;
   receiving from a Mobile Station (MS) a second index group in which the indices of the relay stations are sorted according to channel information between the MS and each relay station; and
   selecting a relay station to be used to communicate with the MS by using the first index group and the second index group,
   wherein the step of selecting a relay station to be used comprises:
   generating a search matrix by using the first index group and the second index group; and
   selecting a relay station to be used according to the search matrix,
   wherein each element of the search matrix is determined based on a combination of an order of indices in the first index group and an order of indices in the second index group.

10. The method of claim 9, further comprising estimating channel information between the MS and each relay station.

11. The method of claim 9, wherein the channel information is a Signal to Noise Ratio (SNR).

12. The method of claim 11, wherein the step of generating a first index group comprises sorting the indices of the relay stations in descending order relative to the SNR received from the relay stations.

13. The method of claim 9, wherein an (i,j)-th element of the search matrix shows whether an i-th relay station index of the first index group is equal to a j-th relay station index of the second index group.

14. The method of claim 13, wherein the search matrix is expressed as:

$$S = \begin{bmatrix} S_{1,1} & S_{1,2} & \cdots & S_{1,M-1} & S_{1,M} \\ S_{2,1} & S_{2,2} & \cdots & S_{2,M-1} & S_{2,M} \\ \cdots & \cdots & \cdots & \cdots & \cdots \\ S_{M-1,1} & S_{M-1,2} & \cdots & S_{M-1,M-1} & S_{M-1,M} \\ S_{M,1} & S_{M,2} & \cdots & S_{M,M-1} & S_{M,M} \end{bmatrix},$$

where M denotes the number of candidate relay stations, and if the i-th element of the first index vector is equal to the j-th element of the second index vector, $S_{i,j}$ ($1 \leq i \leq M$, $1 \leq j \leq M$, i,j are integers) is set to '1', and otherwise, set to '0'.

15. The method of claim 13, wherein the step of selecting a relay station to be used according to the search matrix comprises selecting a relay station by sequentially searching the search matrix starting from an (i,j)-th element whose sum of i and j are the smallest.

16. The method of claim 15, wherein, in the step of searching for a relay station to be used according to the search matrix, a plurality of relay stations are selected.

17. A method of operating a Mobile Station (MS) in a relay type broadband wireless communication system, comprising the steps of:

generating a first index group in which indices of relay stations are sorted in descending order relative to a Signal to Noise Ration (SNR) between the MS and each relay station;

receiving from a Base Station (BS) a second index group in which the indices of the relay stations are sorted in descending order relative to the SNR between the BS and each relay station;

generating a search matrix by using the first index group and the second index group; and selecting a relay station by sequentially searching the search matrix starting from an (i,j)-th element whose sum of i and j are the smallest, and wherein the search matrix is expressed by $$S = \begin{bmatrix} S_{1,1} & S_{1,2} & \cdots & S_{1,M-1} & S_{1,M} \\ S_{2,1} & S_{2,2} & \cdots & S_{2,M-1} & S_{2,M} \\ \cdots & \cdots & \cdots & \cdots & \cdots \\ S_{M-1,1} & S_{M-1,2} & \cdots & S_{M-1,M-1} & S_{M-1,M} \\ S_{M,1} & S_{M,2} & \cdots & S_{M,M-1} & S_{M,M} \end{bmatrix},$$

where M denotes the number of candidate relay stations, and if the i-th element of the first index vector is equal to the j-th element of the second index vector, $S_{i,j}$ ($1 \leq i \leq M$, $1 \leq j \leq M$, i,j are integers) is set to '1', and otherwise, set to '0'.

* * * * *